(12) United States Patent
Sherwin et al.

(10) Patent No.: US 8,799,943 B1
(45) Date of Patent: Aug. 5, 2014

(54) METHOD AND SYSTEM FOR EFFICIENT MANIFEST MANIPULATION

(71) Applicant: This Technology, Inc., Denver, CO (US)

(72) Inventors: Jeffrey Sherwin, Scarsdale, NY (US); Bryan David Santangelo, Tulsa, OK (US)

(73) Assignee: This Technology, LLC, Denver, CO (US)

( * ) Notice: Subject to any disclaimer, the term of this patent is extended or adjusted under 35 U.S.C. 154(b) by 0 days.

(21) Appl. No.: 13/875,784

(22) Filed: May 2, 2013

(51) Int. Cl.
*H04N 7/10* (2006.01)
*H04N 21/81* (2011.01)

(52) U.S. Cl.
CPC .................................. *H04N 21/812* (2013.01)
USPC .......................... 725/32; 33/34; 33/35; 33/36

(58) Field of Classification Search
None
See application file for complete search history.

(56) References Cited

U.S. PATENT DOCUMENTS

| | | | |
|---|---|---|---|
| 2005/0060745 A1* | 3/2005 | Riedl et al. | 725/42 |
| 2008/0046929 A1* | 2/2008 | Cho et al. | 725/46 |
| 2010/0175079 A1* | 7/2010 | Braun et al. | 725/32 |
| 2010/0251278 A1* | 9/2010 | Agarwal et al. | 725/9 |
| 2011/0145858 A1* | 6/2011 | Philpott et al. | 725/32 |
| 2012/0198492 A1* | 8/2012 | Dhruv et al. | 725/32 |

\* cited by examiner

*Primary Examiner* — Cai Chen
(74) *Attorney, Agent, or Firm* — Lowenstein Sandler LLP

(57) ABSTRACT

A method and system for manipulating a manifest is disclosed. A server receives a smart appliance a request for a manifest corresponding to a session identifier. The server retrieves from a session server a session manifest based on the session identifier. The server adjusts a session offset based on a difference in a session length represented by the session manifest from a session length represented by a previous session manifest corresponding to the session. When the session manifest comprises an address of an ad break, the server identifies in a cache at least one advertisement to be inserted into the session and replaces at least one address corresponding to at least one segment of the at least one advertisement in the session manifest based on the difference. The server transmits the session manifest to the smart appliance.

20 Claims, 8 Drawing Sheets

| -N | -N-1 | ... | -2 | -1 | 0 | +1 | +2 | +3 | +4 | ... | +N-1 | +N |

Manifests for Session xyz
602

Figure 6

METHOD AND SYSTEM FOR EFFICIENT MANIFEST MANIPULATION

FIELD OF THE INVENTION

The present invention relates generally to service provider video networks, and more particularly to a method and system for efficiently manipulating a session manifest when a length of an ad break pointed to by the manifest changes in length.

BACKGROUND OF THE INVENTION

Traditionally, programming of broadcast and cable television and radio, including content (i.e., the video or audio program) and (the placement of) ads in a video or audio signal stream, has followed a linear model. Programming may be linear in the sense that a program begins and is streamed and in progress when a user chooses to view entertainment content. FIG. 1 illustrates a conventional linear or video-on-demand (VOD) model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 9, represent sections of time reserved for advertisements or "avails." These "avails" may be viewed as advertisement placement opportunities. As used herein, a "placement opportunity" was traditional called an avail and is sometimes referred to as a slot (into which a spot (e.g., an ad or content) is to be inserted). A placement opportunity (PO) is a construct that represents an opportunity to insert an advertisement or entertainment content, and defines the rules for that opportunity, such as its duration, interactivity, ownership, and technical constraints.

As used herein, the term "binding" refers to an identification of signals and content within a placement opportunity (PO). PO's are frequently created for broad amounts of content that are not yet published (i.e., any show on TNT network in the evening). When the show airs and a signal is detected, the signal is bound to the relevant PO's for that show.

As used herein, the term "impression" refers to a showing of an advertisement to a single viewer. For example, if a 30 second spot is placed in 50,000 video-on-demand (VOD) streams and it is known that 30,000 of the streams actually played the ad, then 30,000 impressions of that advertisement have been generated.

As used herein, a "status notification" may be, but is not limited to, an HTTP call from a VOD server with a unique ID that was created when a decision was delivered.

As used herein, the term "break" refers to all of the space in a stream between entertainment content. For example, a group of 4 consecutive 30 second spots between 2 segments of "Two and a Half Men" may be considered as a single break.

As used herein, an estimated starting location of a break in a signal stream is referred to as a signal point. In the context of advertisement placement, these signal points may be referred to as advertisement signal points.

In non-linear systems, such as Video-on-Demand (VOD), the intervals 6, 8, 9 may take on new meanings. The interval 6 is called a pre-roll, i.e., the space in a video that occurs immediately after a user clicks to start a VOD video. The interval 9 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). All of the intervals 6, 8, 9 in such play lists are ripe for the insertion of advertisements, i.e., advertisement placement opportunities.

FIG. 2 depicts a configuration of a conventional Internet-based cable television infrastructure 200 for performing advertising placement decisions in signal streams. On TV, the advertising network was formerly the national network, the cable network, or the cable operator. However, unlike the Internet, where browsers access/display content and then are separately "referred" to a shared advertisement network, the Internet-based cable television infrastructure 200 selects and assembles both the advertisement and the content together and delivers the combined result to customers' "smart appliances" 202a-202n (e.g., Internet ready televisions, radios, smartphones, tablets, PCs, etc.).

Recently, smart appliances 202a-202n, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the smart appliance 202a-202n from a content delivery network (CDN) 204 directly to the application running in the smart appliance 202a-202n without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the smart appliance 202a-202n fetching video in predetermined time chunks—generally two sometimes three, sometimes ten second chunks. The fetched chunks of video are seamlessly stitched together dynamically in the application software of the smart appliance 202a-202n and then displayed so as to appear as a smooth video on the smart appliance 202a-202n.

A Multiple System/Service Operator (MSO—a cable TV organization that owns more than one cable system and may provide broadband Internet service) may wish to rebroadcast video streams on smart appliances. Unfortunately, every connected device, including smart appliances, needs to obtain video in the format that it can consume. Apple, Microsoft, Adobe, etc., have very specific and incompatible formats. To overcome this problem, each of these companies has constructed facilities called content deliver networks (CDN) 204 where a "set top box" for each channel is configured to receive broadcasts from satellites. A signal received by a "set top box" from upstream devices 206 is fed to a transcoder 208 to place the signal in a desired format and to fragment the formatted signal into the predetermined (e.g., 2 second) segments of data. These segments are then stored at the CDN 204 on server farms located physically close to where the content is to be delivered.

To identify a particular channel data stream or "session", including times when a program has ended and before the next program begins, i.e., a placement opportunity, a cue tone is inserted in the channel data stream a predetermined time before the next program begins. The cue tone may be an instance of an SCTE-35 packet. An observer 210, which may be the transcoder 208, informs placement opportunity information service (POIS) 211 of the arrival of the cue tone for subsequent placement of one or more advertisements into the channel data stream by an advertisement service (ADS) 212. If the ADS 212 is known to the POIS 211, then the POIS 211 notifies the ADS 212 of the cue tone notification. The advertisement service 212, in turn, is waiting for the subsequent arrival of requests from a CDN 204 to place advertisements into breaks (i.e. one or more of the segments) in the channel data stream (session).

MSOs, national and local networks prefer to know whether an ad has been played and watched by a subscriber. Equipment manufacturers have traditionally provided this feature in one of two ways: by building intelligence into each smart appliance (e.g., 202a), or by building intelligence into a reporting network, e.g., a cloud computing network, while not altering exiting smart appliances 202a-202n. Both techniques may employ what is known as a manifest file. As used herein, a manifest file, a manifest, or a session manifest, refers to a listing or index of what is contained in each of the segments of a session maintained by the CDN 204. More particularly, the session manifest may include a list of URLs which point to each of the segments or chunks and notes the type of segment: content or advertisement.

When intelligence is built into a smart appliance (e.g., 202a), the smart appliance 202a may (1) maintain a copy of the session manifest, (2) perform the function of splicing an ad into a placement opportunity (3) mark the session manifest for each segment played, and (4) report a proportion of a session (e.g., the number of segments) played to the MSO or network.

MSOs and networks, however, may prefer to employ any manufacturer's smart appliance (e.g., 202a). Both the MSOs and the networks have been moving toward providing their own viewing experience by providing only applications "apps" to a subscriber's equipment without altering the equipment.

When intelligence is built into the network, then reporting networks need to maintain a separate manifest for each viewer session. Conventionally, a manifest manipulator may be employed to provide manifests to smart appliances or MSOs. One deficiency of conventional manifest manipulators is that it may be necessary for a manifest manipulator to maintain a very large number of manifests which need to be updated periodically (e.g., 10-30 seconds) for each subscriber. For some MSOs, the number of smart appliances 202a-202n may be in the thousands to hundreds of thousands. In certain situations, some or all of the smart appliances 202a-202n may request manifests substantially simultaneously. Fortunately, alleviating factors include the number of people watching a given channel simultaneously and zoning.

The likelihood of 100,000 smart appliances 202a-202n all starting a VOD is very, very low, so the load for VOD advertising is rather smooth because not all the smart appliances 202a-202n are typically synchronized. Unfortunately, an MSO may need to render ad decisions for each active session during session startup when a viewer clicks a remote to watch the VOD, even if there may an ad that may be placed an hour and a half into a data stream corresponding to an active session. If a show transmitted on one channel is very popular, (e.g., the Super Bowl), the problem of handling thousands of manifests resurfaces.

To alleviate this problem, an MSO may divide a geographical area into a plurality of smaller geographical zones of service (e.g., 50 zones). A manifest manipulator may be placed in each of these zones to reduce the number of manifests that a manifest manipulator needs to manage. Under normal circumstances, an even smaller number of ad decisions need to be made per channel (e.g., 50).

Unfortunately, even for a small number of manifests to be handled per channel, there may be need to maintain multiple manifests for the same session. Manifests served to different smart appliances 202a-202n within a zone may become "unsynchronized." As discussed above, a manifest, which represents a playlist, may comprise a list of URLs pointing to a predetermined number of segments of streaming data corresponding to a fixed time interval (e.g., fifteen (15), two (2) second "chunks" for a total of a 30 second manifest). Referring now to FIG. 3, a first manifest 302 representing a total of 30 second of advertising (ad1) may comprise, for example 15 URLs 304a-304o (URL1-URL15). In a particular zone, an MSO may swap the single 30 second ad (ad1) for two (2), 15 second ads as shown in a second manifest 306 (ad2, ad3). Because the segments 308a-308p (URL1-URL16) are aligned on two second boundaries, the number of URLs increases by one to sixteen (URL16). Over time, manifest alignment may drift when ads are continuously swapped to change the total length of time of an ad break in either a negative direction or a positive direction as represented by the manifest.

Therefore, there is a need to maintain the integrity of the numbering of URLs in a manifest, and it is necessary to determine where to swap URLs in and out of a manifest when the length of one or more ads changes. Conventional manifest manipulators alleviate this problem by maintaining an offset from an initial manifest provided by the transcoder 208 for each active session and for each channel. A separate thread of execution comprising a distinct instance of a manifest is created and maintained for each value of offset, for all active sessions, and for all active channels. Unfortunately, this may require processing power on the order of hundreds to thousands of threads of execution, translating to a need to maintain and operate a large number of multi-threaded computers. Accordingly, what would be desirable, but has not yet been provided, is a method and system for efficiently manipulating a session manifest when a length of an ad break pointed to by the manifest changes in length.

SUMMARY OF THE INVENTION

The above-described problems are addressed and a technical solution is achieved in the art by providing a method and system for manipulating a manifest. A manifest manipulator of a server receives from a smart appliance a request for a manifest corresponding to a session identifier. The manifest manipulator retrieves from a session server a session manifest based on the session identifier. The manifest manipulator adjusts a session offset based on a difference in a session length represented by the session manifest from a session length represented by a previous session manifest corresponding to the session. When the session manifest comprises an address of an ad break, the manifest manipulator identifies in a cache at least one advertisement to be inserted into the session and replaces at least one address corresponding to at least one segment of the at least one advertisement in the session manifest based on the difference. The manifest manipulator transmits the session manifest to the smart appliance.

In one embodiment, when the session manifest comprises an address of an ad break, the manifest manipulator instructs a client associated with an ad decision service to splice the at least one advertisement into the address of the ad break in the session based on the at least one replaced address of the session manifest.

In an embodiment, instructing an ad service to splice the at least one advertisement into the address of the ad break in the session may further comprise the server transmitting, to the ad decision service, at least one ad call for the address of the ad break corresponding to the session identifier, receiving, from the ad decision service, at least one advertisement, and storing the at least one advertisement in at least one cache. Instructing an ad service to splice the at least one ad into the address of the ad break in the session may further comprise before said splicing, instructing the ad decision service to retrieve the at least one advertisement from the cache.

In an embodiment, the session offset and the previous session manifest are stored in a memory. The memory may be a static random access memory. The session manifest and the previous session manifest differ when the difference is non-zero. When the smart appliance tunes to another channel or terminates its session, the manifest manipulator may reset the session offset to zero.

In an embodiment, the manifest manipulator of the server may receive an original manifest from a transcoder. The manifest manipulator may initially assign a zero offset to the original manifest. The manifest manipulator may derive and maintain a plurality of stored manifests having different offsets from the original manifest. The manifest manipulator may replace one of the stored manifests with the session manifest to produce the previous session manifest.

In an embodiment, the session manifest and the previous session manifest may each comprise a corresponding plurality of URLs pointing to segments of a session corresponding to the session identifier. At least one of the URLs of the session manifest and at least one of the URLs of the previous session manifest may point to different segments of the session.

BRIEF DESCRIPTION OF THE DRAWINGS

The present invention will be more readily understood from the detailed description of exemplary embodiments presented below considered in conjunction with the attached drawings, of which:

FIG. 6 is a block diagram illustrating a plurality manifests stored in static memory, where each of the stored manifests has a different offset from another manifest;

Figure 1:
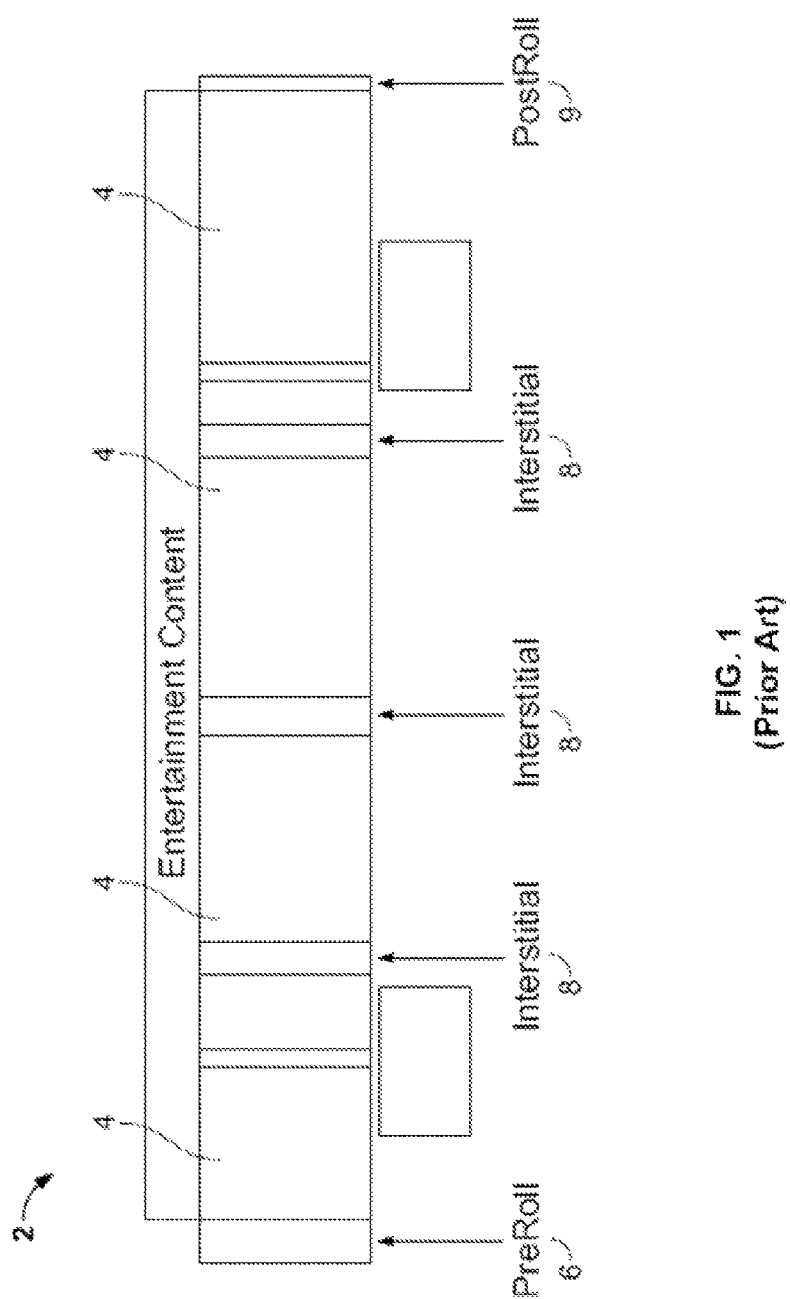
FIG. 1 illustrates a conventional linear or video-on-demand model for advertisement placement.
Figure 2:
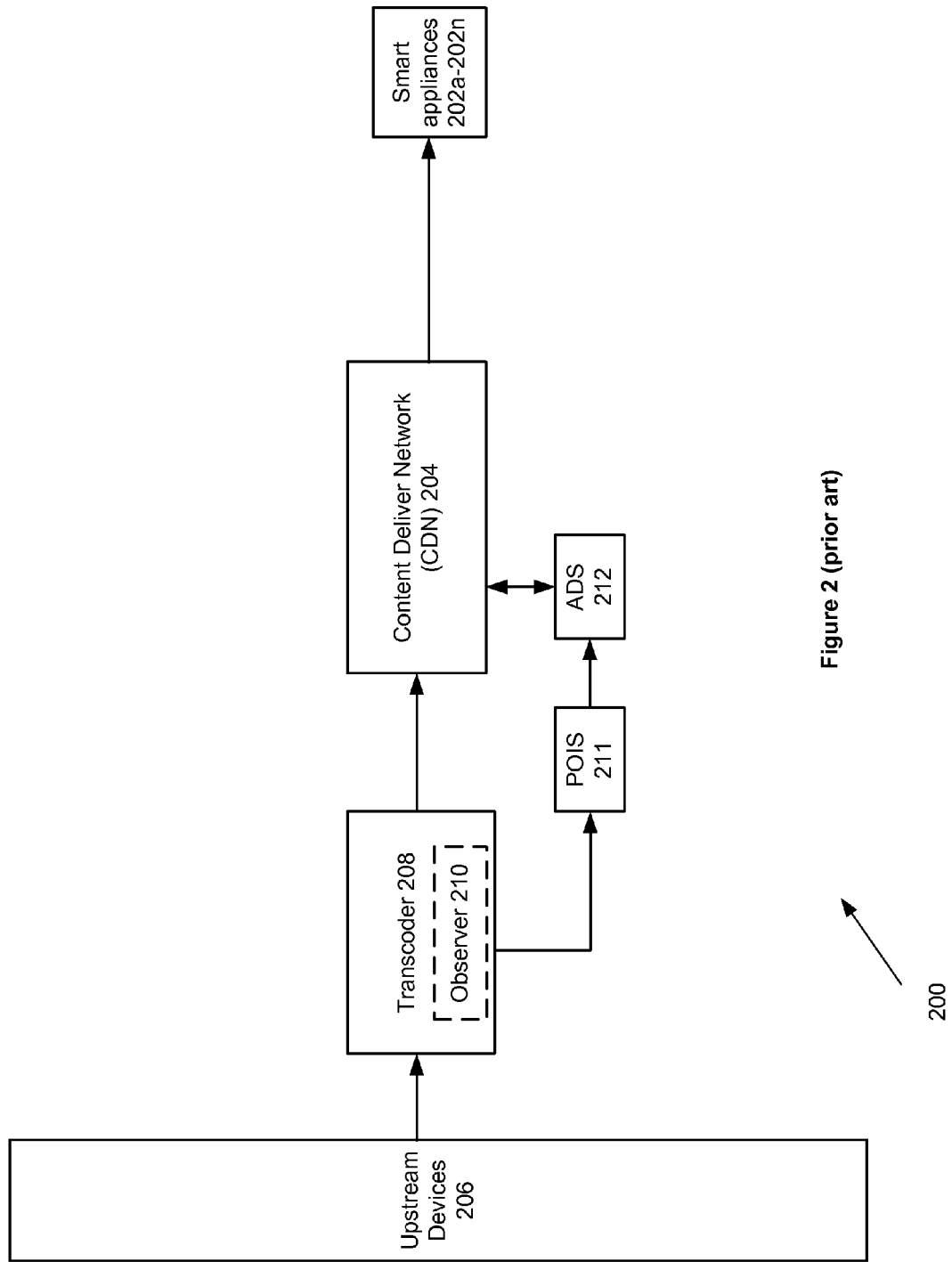
FIG. 2 depicts a configuration of a conventional Internet-based cable television infrastructure for performing advertising placement decisions in signal streams.
Figure 3:
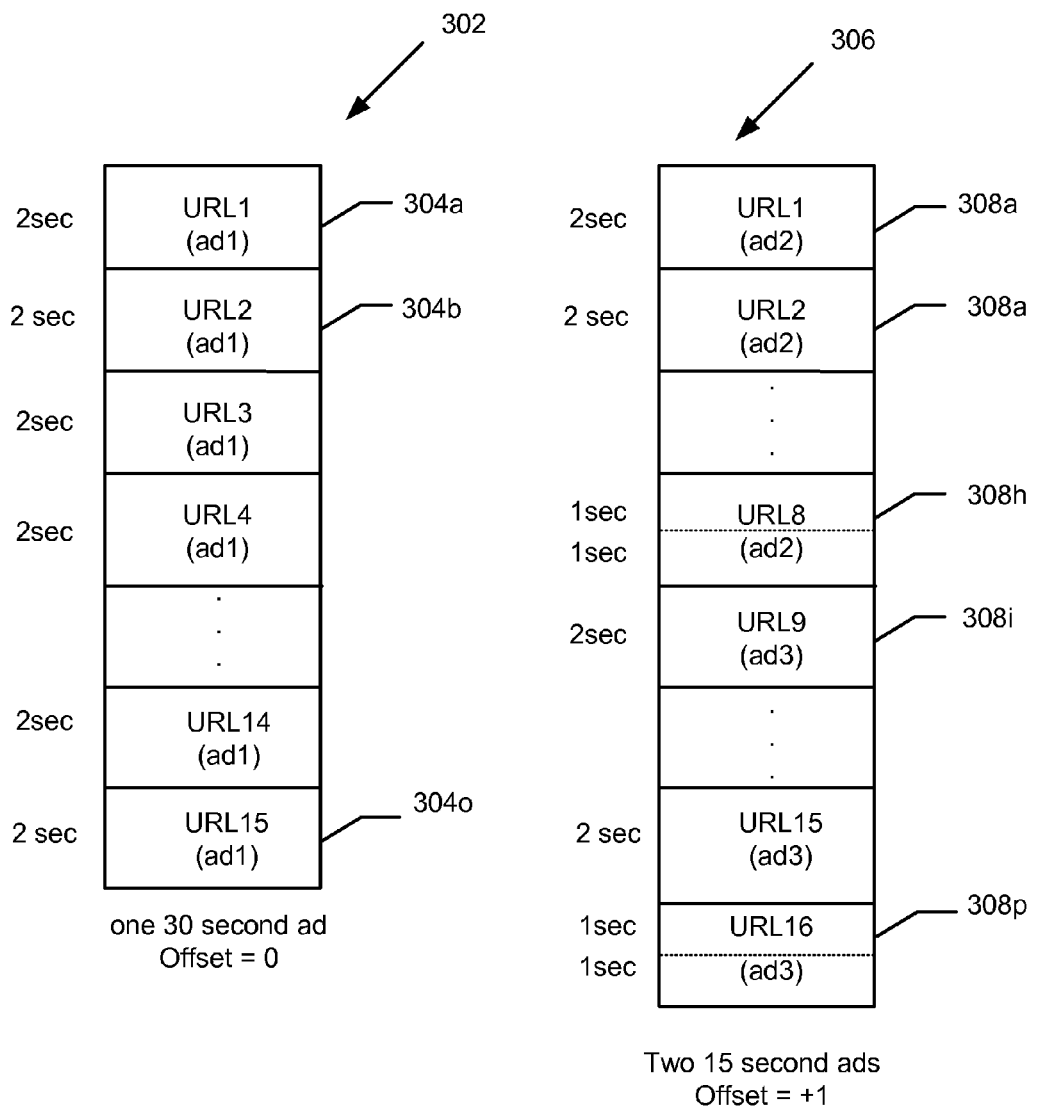
FIG. 3 shows a block diagram of a two manifests that differ in the number of stored URLs that result when ads are continuously swapped to change the total length of time of an ad break.

It is to be understood that the attached drawings are for purposes of illustrating the concepts of the invention and may not be to scale.

DETAILED DESCRIPTION OF THE INVENTION

Certain embodiments of the present disclosure are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as advertisement rotation groups (rotation groups refer to placement opportunities that run in rotation so that the same ad is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Advertisement Management Service (ADM) defines messages in support of advertisement insertion activities. The primary consumer of these messages is an Advertisement Decision Service (ADS). The message interfaces exposed by an ADM permit both pre-configured advertisement decisions as well as real-time fulfillment models. An ADM implementation may incorporate some simple advertisement selection rules (e.g., advertisement rotations) but more complex advertisement decisions are the responsibility of an ADS.

An Advertisement Decision Service (ADS) determines how advertising content is combined with non-advertising (i.e., entertainment) content assets. The decisions made by an ADS may be straightforward (i.e., specific advertisement content placed at a specific time in a specific asset) or arbitrarily complex (based on subscriber data, advertising zone, etc.).

A Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Advertisement Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Advertisement Decision Service (ADS) can retrieve and utilize placement opportunity metadata in their advanced advertising decision making.

The Subscriber Information Service (SIS) manages per-subscriber information relevant to advertisement placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 8), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 4:
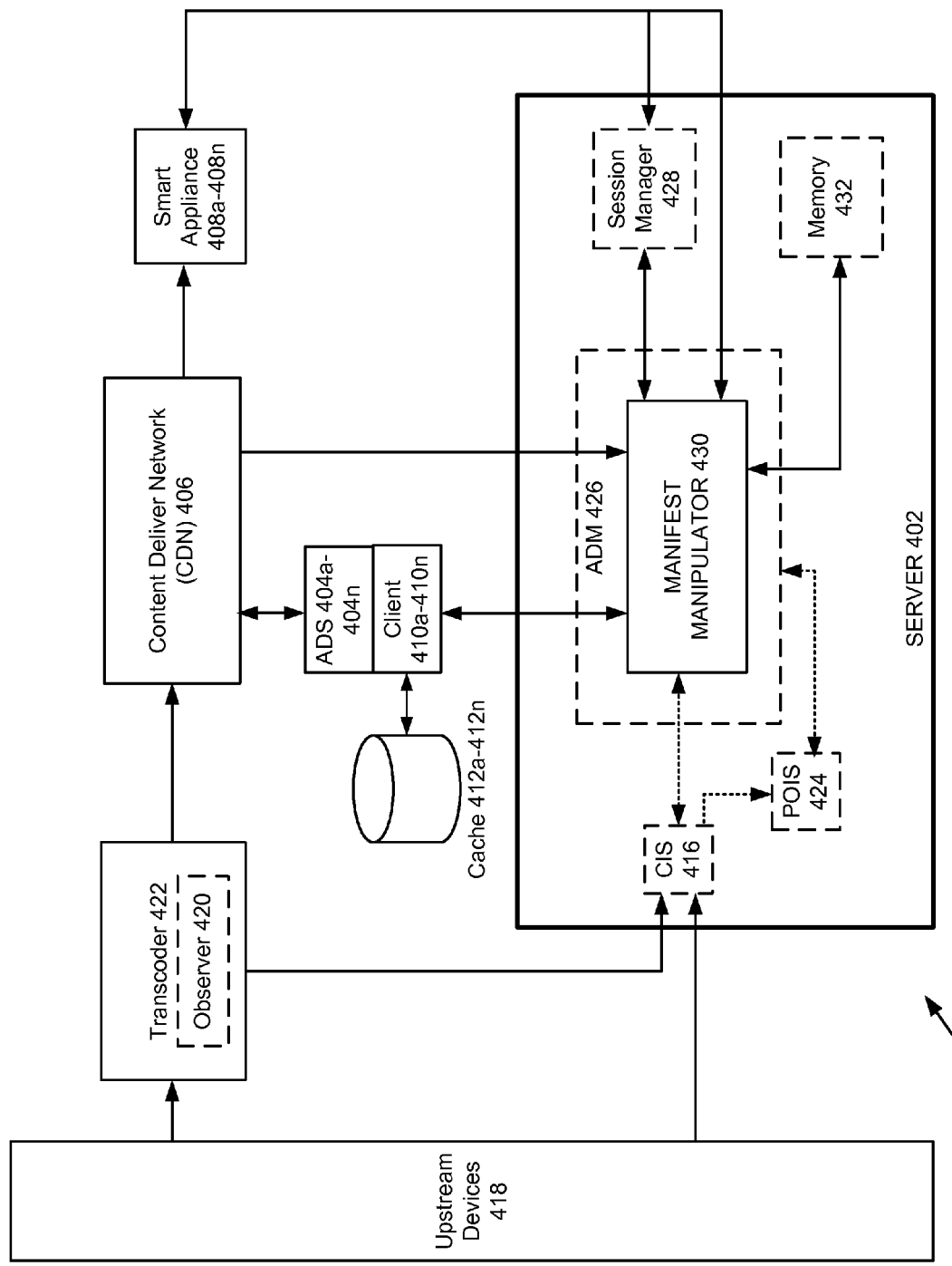
FIG. 4 depicts a configuration of one embodiment of a system for manipulating manifests.

FIG. 4 depicts a configuration of a system 400 for manipulating manifests. The system 400 may be executed on a server 402, interconnected by one or more networks (not shown) and communicatively connected to one or more ADSs 404a-404n. The ADSs 404a-404n are configured to place advertisements into advertisement breaks in subscriber data streams at the request of a CDN 406 for delivery to one or more smart appliances 408a-408n.

In one embodiment, the server 402 may be communicatively connected by one or more networks (not shown) to client devices 410a-410n. The client devices 410a-410n are configured to store and retrieve a predetermined number of advertisements to/from corresponding caches 412a-412n for delivery to corresponding ADSs 404a-404n under the control of the server 402 and the CDN 406.

The server 402 may be associated with or implement a CIS 416 for receiving one or more source signal streams from upstream devices 418 and corresponding cue tones (i.e., instances of SCTE-35 packets) from an observer 420, which may be incorporated within a transcoder 422. The transcoder 422 is also configured to deliver IP video, audio, etc., in predetermined "chunks" or segments to the CDN 406 as described above. The transcoder 422 is also configured to generate one or more manifests of a predetermined time length (e.g., 30 seconds) that comprises the addresses (e.g., URLs) of the segments of a signal stream to one or more downstream devices (normally the CDN 406) based on an address stored in the transcoder 422 during a registration process. In one embodiment, the registered downstream device is the server 402.

The CIS 416 is also configured to identify metadata from the one or more source signal streams and deliver the identified metadata to the server 402. The server 402 is configured to pre-allocate a corresponding number of unconfirmed placement opportunities (POs) without signals and to bind the source signal stream to a plurality of premade, but unconfirmed placement opportunities. Part of the identified metadata includes a channel identifier associated with a corresponding source signal stream. The CIS 416 is configured to return a globally unique value, a UUID, referred to as a signal identifier or signal ID that uniquely identifies a placement opportunity as a confirmed placement and its starting location within the end-to-end operational system 400. The CIS 416 is further configured to insert the signal ID and the channel identifier into the metadata of the source signal stream using the appropriate in-band carriage format.

In one embodiment, when the downstream device that has registered with the transcoder 422 for receiving manifests is the server 402, the CIS 416 is configured to receive one or more original manifests corresponding to a data interval of the source signal stream from the transcoder 422.

In one embodiment, a POIS 424 may be implemented by the server 402. The POIS 424 is configured to "confirm" unconfirmed placement opportunities by identifying temporal starting locations of the unconfirmed placement opportunities (i.e., including advertisement signal point(s)) relative to both the content stream and a wall clock. The POIS 424 is configured to return a globally unique value, a UUID, referred to as a signal identifier or signal ID that uniquely identifies a PO as a confirmed PO and its starting location within the end-to-end operational system. The POIS 424 then inserts the signal ID and the channel identifier into other extracted metadata of the source signal stream using the appropriate in-band carriage format.

The POIS 424 is configured to initiate a workflow where by the confirmed signal generates the set of confirmed placement opportunities and fires a look-ahead decision trigger with the signal ID as the trigger data. The look-ahead decision trigger recipient is an instance of an SCTE 130 Ad Management Service 426, or ADM 426 associated with the server 402. The ADM 426 is configured to identify a list representative of a number of recipient signal streams having the channel identifier. To identify the list, in one embodiment, the ADM 426 transmits and receives messages and data to/from the session manager 428 internally implemented by the server 402. In one embodiment, the ADM 426 transmits the channel identifier to the session manager 428, which provides the ADM 426 with a list of client identities indicative of a number of active transport streams (e.g., a number of sessions) having the channel identifier, e.g., a list of recipient signal streams having the same channel identifier that are currently being "watched" by subscribers. The ADM 426 is also configured to obtain a plurality of advertisements corresponding to the list of all active sessions from one or more ADSs 404a-404n. The ADM 426 receives, from the ADSs 404a-404n, the plurality of advertisements targeted to the list representative of the plurality of active signal streams.

The ADM 426 uses the signal ID plus a set of locally configured or learned targeting criteria to initiate a unique set of ad decision requests. The ad decision requests evolve into targeted ad decision requests to the appropriate decision owners and the results are a set of ad placement decisions correlating to the placement opportunities generated as a result of signal confirmation.

The ADM 426 is also configured to stores the obtained list of advertisements in one or more caches 412a-412n under the control of corresponding clients 410a-410n associated with one or more ADSs 404a-404n. The ADM 426 associates the unique signal ID with each of the targeted/untargeted advertisements and stores the targeted/untargeted advertisements in the one or more caches 412a-412n. Since there may be thousands to millions of ads to be stored in the one or more caches 412a-412n, in an embodiment, the ADM 426 is configured to divide a time interval between reception of a cue tone and the arrival of a corresponding advertisement signal point into a predetermined number of sub-time intervals and divide the signal stream into a predetermined number of sub-signal streams.

In one embodiment, the ADM 426 is further configured to implement a manifest manipulator 430 and a memory 432, which may be, for example, a static random-access memory 432. The manifest manipulator 430 is configured to receive one or more original manifests from the CIS 416. For each active session in the list representative of the plurality of active sessions, the manifest manipulator 430 associates the original manifest with the corresponding channel identifier, a session identifier, and an initial offset of zero in the (static) memory 432. The manifest manipulator 430 is configured to derive and maintain in the (static) memory a plurality of stored manifests having different offsets from the original manifest.

In one embodiment, the manifest manipulator 430 is configured to receive from a smart appliance (e.g., 408a) a request for a manifest corresponding to a session identifier and a channel identifier. The manifest manipulator 430 is configured to retrieve from the session manger 428 a session manifest based on the session identifier. The manifest manipulator 430 is configured to adjust a session offset based on a difference in a session length represented by the session manifest from a session length represented by a previous session manifest corresponding to the session. When the session manifest comprises an address of an ad break, the manifest manipulator 430 is configured to identify in a cache (e.g., 412a) at least one advertisement to be inserted into the session and replaces at least one address corresponding to at least one segment of the at least one advertisement in the session manifest based on the difference. The manifest manipulator 430 is configured to transmit the session manifest to the smart appliance (e.g., 408a).

In one embodiment, when the session manifest comprises an address of an ad break, the manifest manipulator 430 is configured to instruct a client (e.g., 410a) associated with an ad decision service (e.g., ADS 404a) to splice the at least one advertisement into the address of the ad break in the session based on the at least one replaced address of the session manifest.

In an embodiment, instructing an ad decision service (e.g., 404a) to splice the at least one advertisement into the address of the ad break in the session may further comprise the server 402 transmitting, to the ad decision service (e.g., 404a), at least one ad call for the address of the ad break corresponding to the session identifier, receiving, from the ad decision service (e.g., 404a), at least one advertisement, and storing the at least one advertisement in at least one cache (e.g., 412a). Instructing an ad decision service (e.g., 404a) to splice the at least one ad into the address of the ad break in the session may further comprise before the splicing, instructing the ad decision service (e.g., 404a) to retrieve the at least one advertisement from the cache (e.g., 412a).

In an embodiment, the manifest manipulator 430 is configured to store the session offset and the previous session manifest in the memory 432. The memory 432 may be a static random access memory. The session manifest and the previous session manifest differ when the difference is non-zero. When the smart appliance (e.g., 408a) tunes to another channel or terminates its session, the manifest manipulator 430 may reset the session offset to zero.

In an embodiment, the manifest manipulator 430 of the server 402 may receive an original manifest from the transcoder 422. The manifest manipulator 430 may initially assign a zero offset to the original manifest. The manifest manipulator 430 may derive and maintain a plurality of stored manifests having different offsets from the original manifest. The manifest manipulator 430 may replace one of the stored manifests with the session manifest to produce the previous session manifest.

Figure 5:
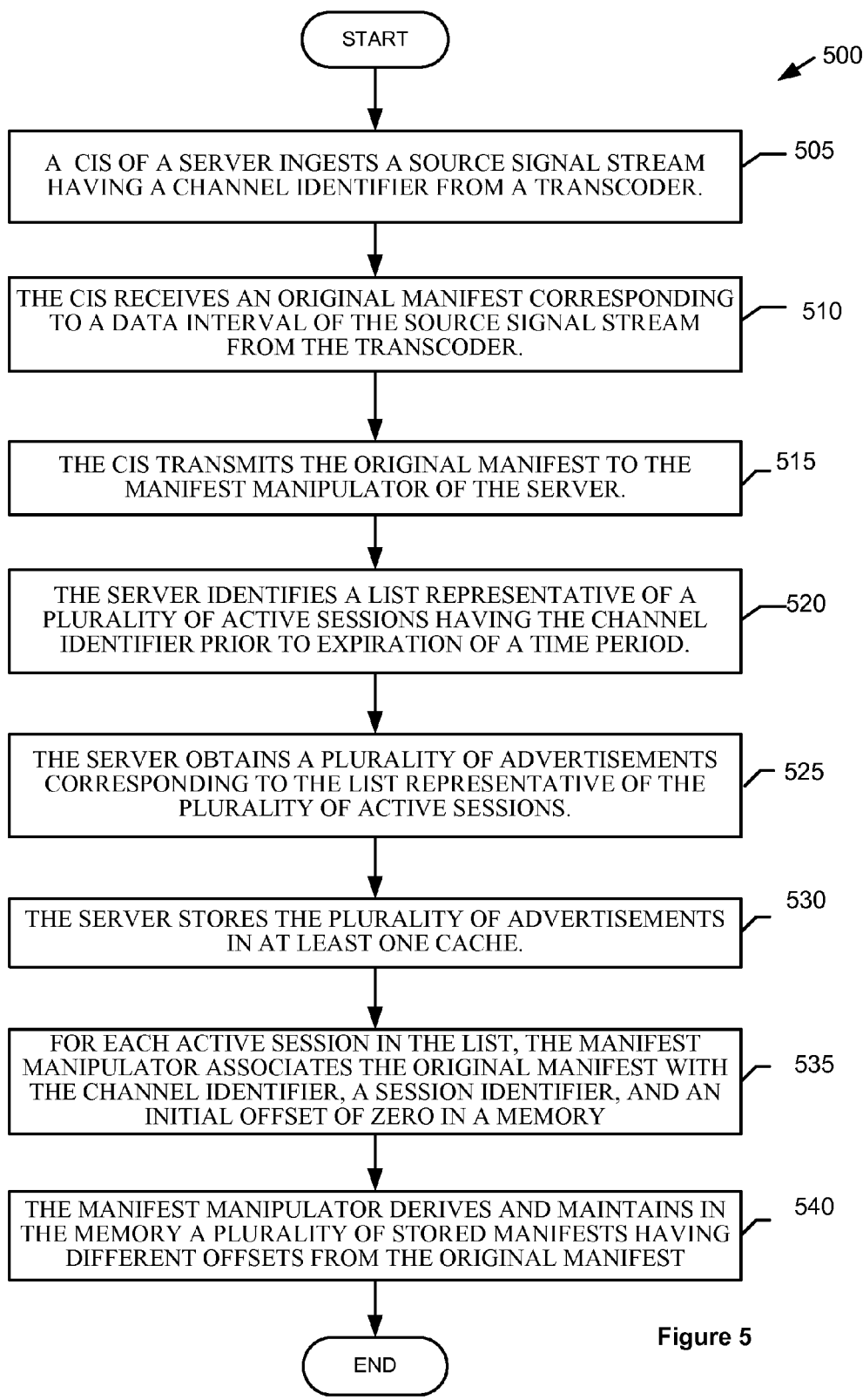
FIG. 5 is a flow diagram illustrating one embodiment of a method for accelerating advertising placement decisions in data streams from a point of view of a server.

FIG. 5 is a flow diagram illustrating one embodiment of a method 500 for accelerating advertising placement decisions in data streams from a point of view of a server 402, according to an embodiment of the present invention. At block 505, the server 402 ingests a source signal stream from the transcoder 422. More particularly, the CIS 416 associated with the server 402 ingests a source signal stream (e.g., in MPEG-2 format) having a channel identifier from the upstream devices 418.

A transcoder 422 associated with a specific vendor format for the source signal stream (e.g., TBS) receives the signal stream and converts the signal stream to IP video. In the process, an observer 420, which may be include in transcoder 422, notes the presence of an SCTE-35 cue tone. In one embodiment, the indication that an advertisement placement opportunity is located in the signal stream is an instance of an SCTE-35 packet indicative of a cue tone. The cue tone also provides an indication that an advertisement placement opportunity is located in the signal stream a time period prior to an advertisement signal point in the signal stream. The observer 420 of the transcoder 422 then places a web call to the CIS 416 to inform the CIS 416 that the cue tone for a specific channel ID has been observed.

The transcoder 422 may identify the server 402 as previously registered to receive a series of original manifests associated the source signal stream (e.g., TBS). As a result of the transcoder 422 dividing the source signal stream into a plurality of data intervals of a predetermined length (e.g., 30 second), and for each data interval, into a plurality of segments or "chunks" (e.g., 2 seconds). The transcoder 422 is further configured to construct and transmit an original manifest to the server 402. At block 510, the CIS 416 further receives the original manifest corresponding to a data interval of the source signal stream from the transcoder 422. At block 515, the CIS 416 transmits the original manifest to the manifest manipulator 430 for further processing to be described below.

The arrival of the SCTE-35 packet is an indication of a number of theoretical placement opportunities (POs) for the specified channel ID (e.g., TBS). Each unconfirmed PO has an estimated starting location known as a signal point. The signal point needs to be confirmed. When an actual ad insertion starting location is encountered in real-time, a software process in the POIS 424 confirms the actual time of the signal point. This confirmed signal point results in the generation of confirmed POs that are now ready for ad insertion.

When the CIS 416 receives the theoretical placement opportunities, the CIS 416 is configured to pre-allocate a corresponding number of unconfirmed placement opportunities without signals and to bind the source signal stream to a plurality of premade, but unconfirmed placement opportunities. Binding the source signal stream to a plurality of premade, but unconfirmed placement opportunities includes the CIS 416 extracting metadata including the channel identifier from the source signal stream. As used herein, the term "binding" refers to an identification of signals and content within a PO. PO's are frequently created for broad amounts of content that are not yet published (i.e., any show on TNT network in the evening).

When a show "airs" and a source signal stream is detected, the source signal stream is bound to the relevant PO's for that show.

When confirmed POs are generated, the same signal point identifier that generated the POs is forwarded and captured by a listening ad decision resolution process in the ADM 426 associated with the server 402. This signal point forwarding is called the look-ahead placement decision trigger (or decision trigger for short) that initiates a sequence of software processes. As content is acquired by the CDN 406, the CDN 406 notifies the POIS 424, and the POIS 424 "confirms" the temporal starting location of a placement opportunity relative to both the source signal stream and a wall clock. The POIS 424 returns a globally unique value, a UUID, referred to as a signal identifier or signal ID that uniquely identifies a PO as a confirmed PO and its starting location within the end-to-end operational system. The POIS 424 then inserts the signal ID and the channel identifier into other extracted metadata of the source signal stream using the appropriate in-band carriage format.

In parallel, the POIS 424 initiates a workflow whereby the POIS generates a set of confirmed placement opportunities in the source signal stream and fires a look-ahead decision trigger with the signal ID as the trigger data. The look-ahead decision trigger recipient is an instance of an SCTE 130 Ad Management Service, or the ADM 426 associated with the server 402.

At block 520, the ADM 426 of the server 402 identifies a representative of a number of recipient signal streams having the channel identifier prior to expiration of the time period. The list representative of a plurality of recipient signal streams having the channel identifier corresponds to the number of confirmed placement opportunities. To identify the list, the ADM 426 transmits the channel identifier to the session manager 428, which provides the ADM 426 with a list of session identifiers indicative of a number of recipients currently viewing a channel corresponding to the channel identifier.

At block 525, the ADM 426 of the server 402 obtains from one or more ADSs 404a-404n a plurality of advertisements corresponding to the list correlated to the session identifiers and the channel identifier. The ADM 426 receives from the ADSs 404a-404n, the plurality of advertisements corresponding to the list representative of the plurality of recipient signal streams having the channel identifier.

At block 530, the ADM 426 of the server 402 stores the obtained list of advertisements in at least one cache 412a-412n in the one or more ADSs 404a-404n. While storing the list of advertisements in the least one cache 412a-412n, the ADM 426 associates unique signal IDs with each of the list of advertisements. Storing the obtained list of advertisement in the at least one cache 412a-412n may include transmitting the list of advertisements to at least one JAR (i.e., a Java archive) associated with the one or more clients 410a-410n. Since there may be thousands to millions of ads to be stored in the caches 412a-412n, in an embodiment, the ADM 426 divides the time interval from the reception of a cue tone to an expected arrival of the corresponding signal point in the source signal stream into a predetermined number of sub-time intervals and divides the number (i.e., the count) of received signal streams into a predetermined number of sub-signal streams. The predetermined number of sub-signal streams is distributed over the predetermined number of sub-time intervals to the caches 412a-412n associated with the clients 410a-410n.

At block 535, for each active session in the list, the manifest manipulator 430 associates the original manifest with a channel identifier, a session identifier, and an initial offset of zero in a memory 432. In one embodiment, the memory 432 may be, for example, a static memory. The offset indicates the number of segments and corresponding URLs of a session manifest to be delivered to a smart appliance (e.g., 408a) deviates from the number of segment in a corresponding previous session manifest (see FIG. 7).

At block 540, the manifest manipulator 430 derives and maintains in the static memory (see FIG. 6) a plurality of stored manifests 602 having different offsets from the original manifest. In one embodiment, the statically stored manifests/and the corresponding number of segments per stored manifest may be numbered consecutively from a minimum expected negative value, through 0, to positive maximum expected value. As ads are retrieved and inserted into ad breaks, the value of the offset may change and an original or a non-original "previous" session manifest may be replaced (see FIG. 7) depending on the length of one or more ads to be inserted into the ad break.

Figure 7:
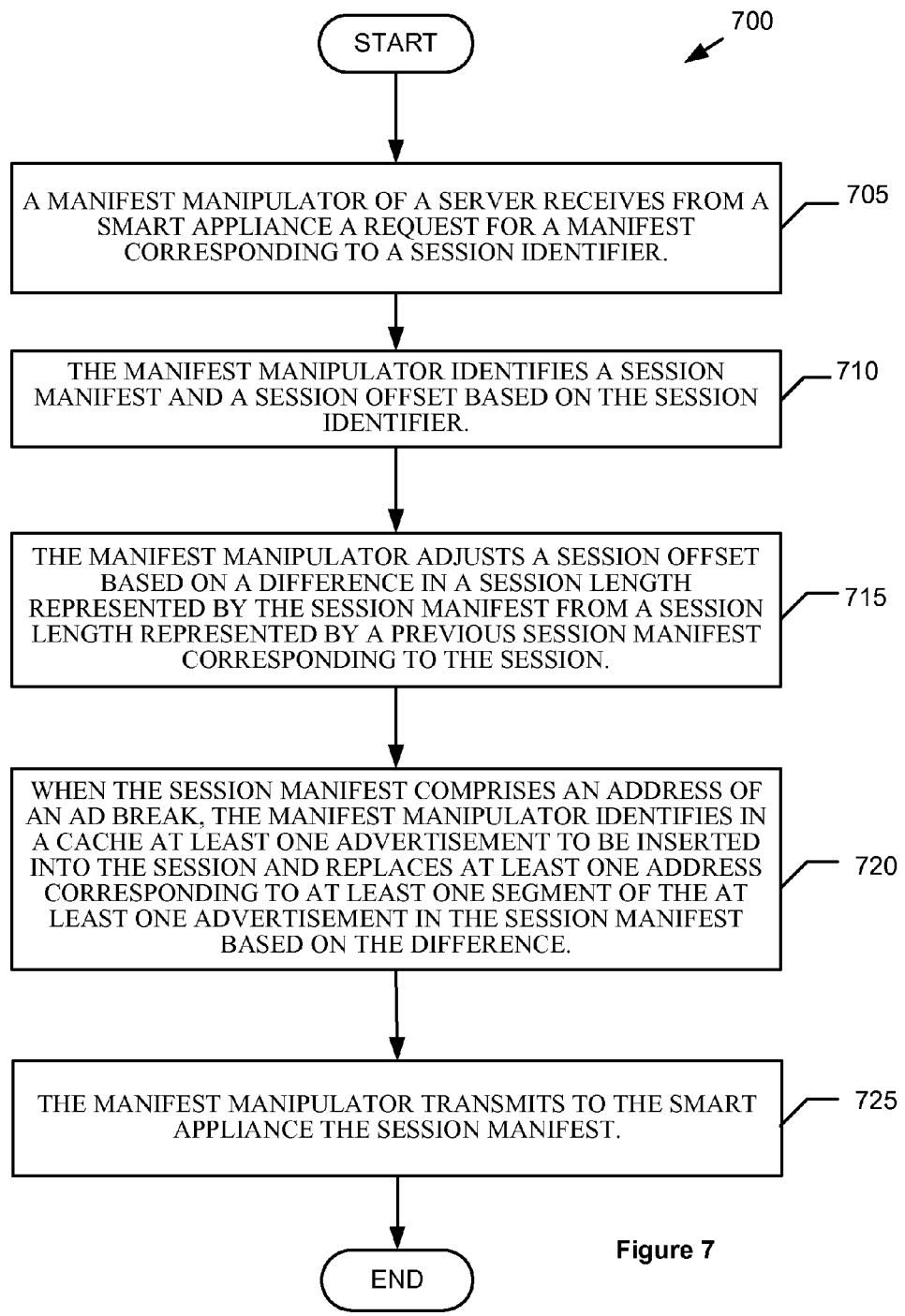
FIG. 7 is a flow diagram illustrating an example of a method for manipulating a manifest.

FIG. 7 is a flow diagram illustrating an example of a method 700 for manipulating a manifest. The method 700 may be performed by a computer system 400 of FIG. 4 and may comprise hardware (e.g., circuitry, dedicated logic, programmable logic, microcode, etc.), software (e.g., instructions run on a processing device), or a combination thereof. In one example, the method 700 is performed by the manifest manipulator 430 of the server 402 of FIG. 4.

As shown in FIG. 7, at block 705, the manifest manipulator 430 of the server 402 receives a request for a manifest corresponding to a session identifier from a smart appliance (e.g., 408a). At block 710, the manifest manipulator 430 identifies a session manifest from the session manager 432 and an offset based on the session identifier. The session manifest and current offset are identified as one of the stored manifests and offsets located in the static memory 432.

At block 715, the manifest manipulator 430 adjusts a session offset based on a difference in a session length represented by the session manifest from a session length represented by a previous session manifest stored in the memory 432 corresponding to the session. In one embodiment, based on the session identifier, the manifest manipulator 430 identifies a client (e.g., 404a) from which to obtain the length of time of at least one ad. The manifest manipulator 430 adjusts the session offset based on the length of the retrieved at least one ad. The manifest manipulator 430 replaces the previously stored session offset in the memory 432 with the adjusted session offset.

At block 720, when the current manifest comprises an address of an ad break, the manifest manipulator 430 identifies in a cache (e.g. 412a) at least one advertisement to be inserted into the session and replaces at least one address corresponding to at least one segment of the at least one advertisement in the session manifest based on the difference. The manifest manipulator 430 replaces the previous session manifest (which may be an original session manifest or another updated previous manifest) in the memory 432 with the updated session manifest.

At block 720, the manifest manipulator 430 transmits the updated session manifest to the smart appliance (e.g., 408a).

If the adjusted offset does not change because the total length of the ad break does not change, or if there is only content addressed by the current manifest, then the previously stored manifest is a copy of the current manifest. The previously stored manifest is a copy of another manifest different from the current manifest when the session offset change value. Further, when the smart appliance (e.g., 408a) tunes to another channel or terminates its session, the session offset is reset to zero. The method of FIG. 7 is repeated whenever the transcoder 422 delivers a new original manifest as the transport stream progresses in time transmitted.

In an embodiment, when the session manifest comprises an address of an ad break, the server 402 may instruct a client (e.g., 410a) associated with an ad decision service (e.g., 404a) to splice the at least one advertisement from an associated cache (e.g., 412a) into the address of the ad break in the session based on the at least one replaced address of the session manifest. Instructing an ad decision service (e.g., 404a) to splice the at least one advertisement into the address of the ad break in the session may further comprise the server 402 transmitting, to the ad decision service (e.g., 404a), at least one ad call for the address of the ad break corresponding to the session identifier, receiving, from the ad decision service (e.g., 404a) at least one advertisement, and storing the at least one advertisement in the associated cache (e.g., 412a). Instructing an ad decision service (e.g., 404a) to splice the at least one ad into the address of the ad break in the session may further comprise, before splicing, the manifest manipulator 430 instructing the ad decision service (e.g., 404a) to retrieve the at least one advertisement from the associated cache (e.g., 412a).

Figure 8:
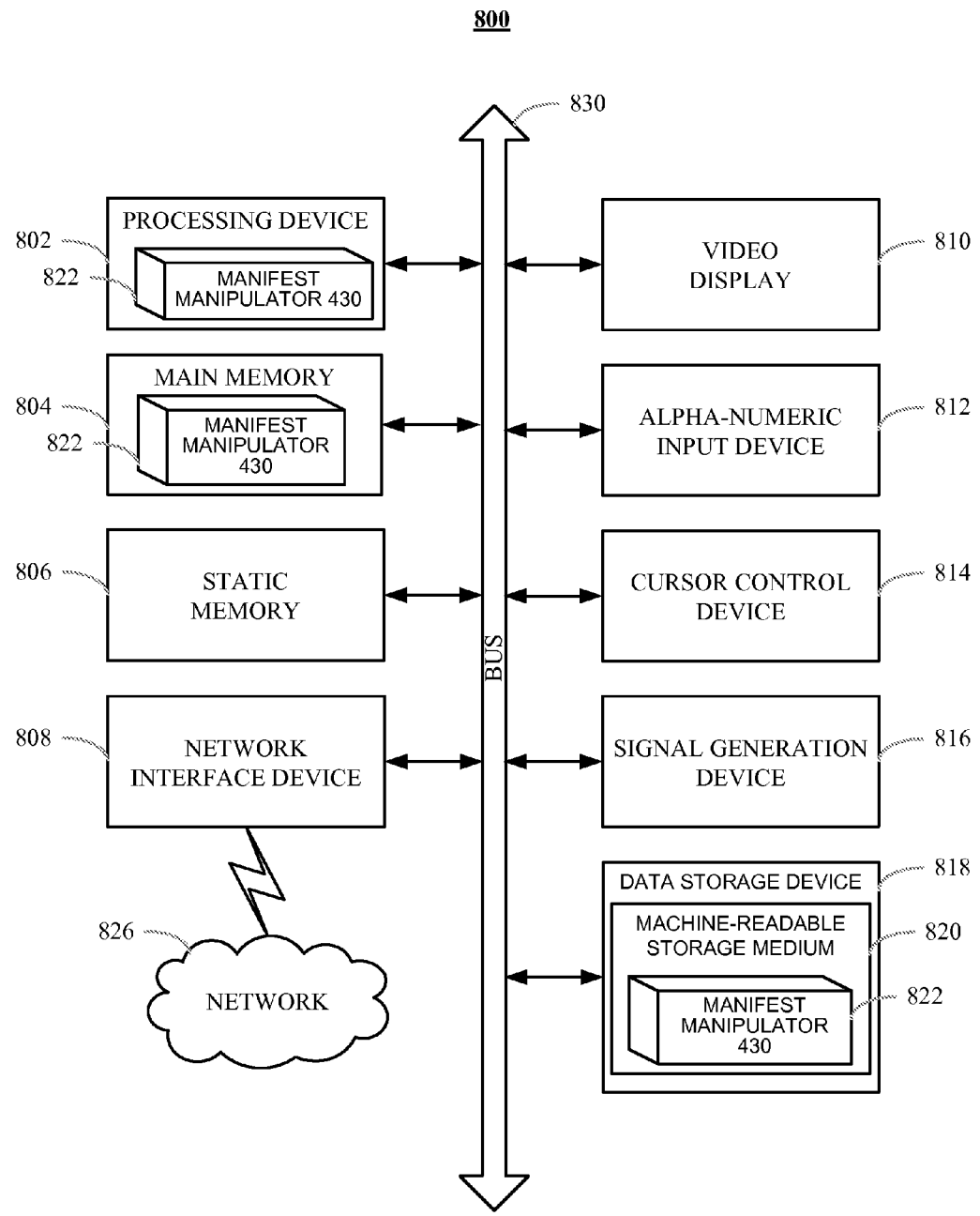
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the example form of a computer system 800 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The manifest manipulator 830 shown in FIG. 4 may be executed by processor 802 configured to perform the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

A drive unit 816 may include a computer-readable medium 824 on which is stored one or more sets of instructions (e.g., instructions of the manifest manipulator 430) embodying any one or more of the methodologies or functions described herein. The instructions of the manifest manipulator 430 may also reside, completely or at least partially, within the main memory 804 and/or within the processor 802 during execution thereof by the computer system 800, the main memory 804 and the processor 802 also constituting computer-readable media. The instructions of the manifest manipulator 430 may further be transmitted or received over a network via the network interface device 822.

While the computer-readable storage medium 824 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method for manipulating a manifest, comprising:
storing, by the server, one or more manifests in a list of manifests in a memory, the one or more manifests differing in a number of segments corresponding to one or more advertisement breaks of different lengths;
receiving, by a server from a smart appliance, a request for a manifest having a first length of an advertisement break corresponding to a first number of segments corresponding to the advertisement break;
attempting to identify, by the server, a manifest having a substantially matching length to the first length of the advertisement break and having a matching number of segments to the first number of segments corresponding to the advertisement break in the list of one or more manifests stored in the memory;
when the server identifies a manifest in the list of the one or more manifests stored in the memory having the substantially matching length to the first length of the advertisement break and having the matching number of segments to the first number of segments corresponding to the advertisement break,
retrieving, by the server, the identified manifest from the list of one or more manifests stored in the memory;
identifying, by the server, at least one advertisement to be inserted into an advertisement break of the identified manifest and replacing one or more addresses of segments in the identified manifest with one or more corresponding addresses of the at least one advertisement; and
transmitting, by the server, the identified manifest to the smart appliance; and
when the server does not identify a manifest in the list of the one or more manifests stored in the memory having the substantially matching length to the first length of the advertisement break and having the matching number of segments to the first number of segments corresponding to the advertisement break,
generating, by the server, a manifest having the substantially matching length to the first length of the advertisement break and having the matching number of segments to the first number of segments corresponding to the advertisement break;
inserting, by the server, the generated manifest in the list of the one or more manifests stored in the memory;
identifying, by the server, at least one advertisement to be inserted into an advertisement break of the generated manifest and replacing one or more addresses of segments in the generated manifest with one or more corresponding addresses of the at least one advertisement; and
transmitting, by the server, the generated manifest to the smart appliance.

2. The method of claim 1, wherein, when the transmitted manifest comprises an address of an advertisement break, instructing, by the server, a client associated with an advertisement decision service to splice at least one advertisement into the advertisement break in a session based on the replacing one or more addresses.

3. The method of claim 2, wherein instructing the advertisement decision service to splice the at least one advertisement into the advertisement break in the session further comprises:
transmitting, to the advertisement decision service using the server, at least one advertisement call for an address of the advertisement break corresponding to a session identifier;
receiving, from the advertisement decision service at the server, at least one advertisement; and
storing, using the server, the at least one advertisement in at least one cache.

4. The method of claim 3, wherein instructing the advertisement decision service to splice the at least one advertisement into the advertisement break in the session further comprises, before said splicing, instructing the advertisement decision service to retrieve the at least one advertisement from the cache.

5. The method of claim 1, wherein the memory is a static random access memory.

6. The method of claim 1, wherein each manifest of the plurality of manifests is associated with an offset.

7. The method of claim 6, wherein, when the smart appliance tunes to another channel or terminates its session, resetting the offset to zero.

8. The method of claim 1, further comprising receiving, by the server, an original manifest from a transcoder.

9. The method of claim 8, further comprising assigning a zero offset to the original manifest.

10. The method of claim 8, each manifest of the plurality of stored manifests have offsets from the original manifest corresponding to a difference in a number of segments.

11. The method of claim 8, wherein the original manifest and each manifest of the plurality of manifests comprise a corresponding plurality of URLs pointing to segments of a session.

12. The method of claim 11, wherein at least one of the plurality of URLs of the original manifest and at least one of the plurality of URLs of one manifest of the plurality of manifests point to different segments of the session.

13. A computer system for manipulating a manifest, comprising:
a memory;
a processing device, coupled to and having access to the memory, the processing device to:
store, one or more manifests in a list of manifests in a memory, the one or more manifests differing in a number of segments corresponding to one or more advertisement breaks of different lengths;
receive, from a smart appliance, a request for a manifest having a first length of an advertisement break corresponding to a first number of segments corresponding to the advertisement break;
attempt to identify a manifest having a substantially matching length to the first length of the advertisement break and having a matching number of segments to the first number of segments corresponding to the advertisement break in the list of one or more manifests stored in the memory;
when the server identifies a manifest in the list of the one or more manifests stored in the memory having the substantially matching length to the first length of the advertisement break and having the matching number of segments to the first number of segments corresponding to the advertisement break,
retrieve the identified manifest from the list of one or more manifests stored in the memory;
identify at least one advertisement to be inserted into an advertisement break of the identified manifest and replacing one or more addresses of segments in the identified manifest with one or more corresponding addresses of the at least one advertisement; and
transmit the identified manifest to the smart appliance; and
when the server does not identify a manifest in the list of the one or more manifests stored in the memory having the substantially matching length to the first length of the advertisement break and having the matching number of segments to the first number of segments corresponding to the advertisement break,
generate a manifest having the substantially matching length to the first length of the advertisement break and having the matching number of segments to the first number of segments corresponding to the advertisement break;
insert the generated manifest in the list of the one or more manifests stored in the memory;
identify at least one advertisement to be inserted into an advertisement break of the generated manifest and replacing one or more addresses of segments in the generated manifest with one or more corresponding addresses of the at least one advertisement; and
transmit the generated manifest to the smart appliance.

14. The system of claim 13, wherein, when the transmitted manifest comprises an address of an advertisement break, instructing, by the server, a client associated with an advertisement decision service to splice at least one advertisement into the advertisement break in a session based on the replacing one or more addresses.

15. The system of claim 14, wherein instructing the advertisement decision service to splice the at least one advertisement into the advertisement break in the session further comprises:
transmitting, to the advertisement decision service using the server, at least one advertisement call for an address of the advertisement break corresponding to a session identifier;
receiving, from the advertisement decision service at the server, at least one advertisement; and
storing, using the server, the at least one advertisement in at least one cache.

16. A non-transitory computer readable storage medium including instructions that, when executed by a processing system, causes the processing system to perform operations, comprising:
storing, by the server, one or more manifests in a list of manifests in a memory, the one or more manifests differing in a number of segments corresponding to one or more advertisement breaks of different lengths;
receiving, by a server from a smart appliance, a request for a manifest having a first length of an advertisement break corresponding to a first number of segments corresponding to the advertisement break;
attempting to identify, by the server, a manifest having a substantially matching length to the first length of the advertisement break and having a matching number of segments to the first number of segments corresponding to the advertisement break in the list of one or more manifests stored in the memory;
when the server identifies a manifest in the list of the one or more manifests stored in the memory having the substantially matching length to the first length of the advertisement break and having the matching number of segments to the first number of segments corresponding to the advertisement break,
retrieving, by the server, the identified manifest from the list of one or more manifests stored in the memory;
identifying, by the server, at least one advertisement to be inserted into an advertisement break of the identified manifest and replacing one or more addresses of segments in the identified manifest with one or more corresponding addresses of the at least one advertisement; and
transmitting, by the server, the identified manifest to the smart appliance; and
when the server does not identify a manifest in the list of the one or more manifests stored in the memory having the substantially matching length to the first length of the advertisement break and having the matching number of segments to the first number of segments corresponding to the advertisement break,
generating, by the server, a manifest having the substantially matching length to the first length of the advertisement break and having the matching number of segments to the first number of segments corresponding to the advertisement break;
inserting, by the server, the generated manifest in the list of the one or more manifests stored in the memory;
identifying, by the server, at least one advertisement to be inserted into an advertisement break of the generated manifest and replacing one or more addresses of segments in the generated manifest with one or more corresponding addresses of the at least one advertisement; and transmitting, by the server, the generated manifest to the smart appliance.

17. The non-transitory computer readable storage medium of claim 16, wherein, when the transmitted manifest comprises an address of an advertisement break, instructing, by the server, a client associated with an advertisement decision service to splice at least one advertisement into the advertisement break in a session based on the replacing one or more addresses.

18. The non-transitory computer readable storage medium of claim 17, wherein instructing the advertisement decision service to splice the at least one advertisement into the advertisement break in the session further comprises:

transmitting, to the advertisement decision service using the server, at least one advertisement call for an address of the advertisement break corresponding to a session identifier;

receiving, from the advertisement decision service at the server, at least one advertisement; and storing, using the server, the at least one advertisement in at least one cache.

19. The non-transitory computer readable storage medium of claim 16, wherein the memory is a static random access memory.

20. The system of claim 13, wherein the memory is a static random access memory.

\* \* \* \* \*